March 3, 1964 E. S. SHOEMAKE ET AL 3,123,239
DUMP TRAILER FOR AUTOMATIC HAY BALER
Filed Sept. 6, 1961 4 Sheets-Sheet 3
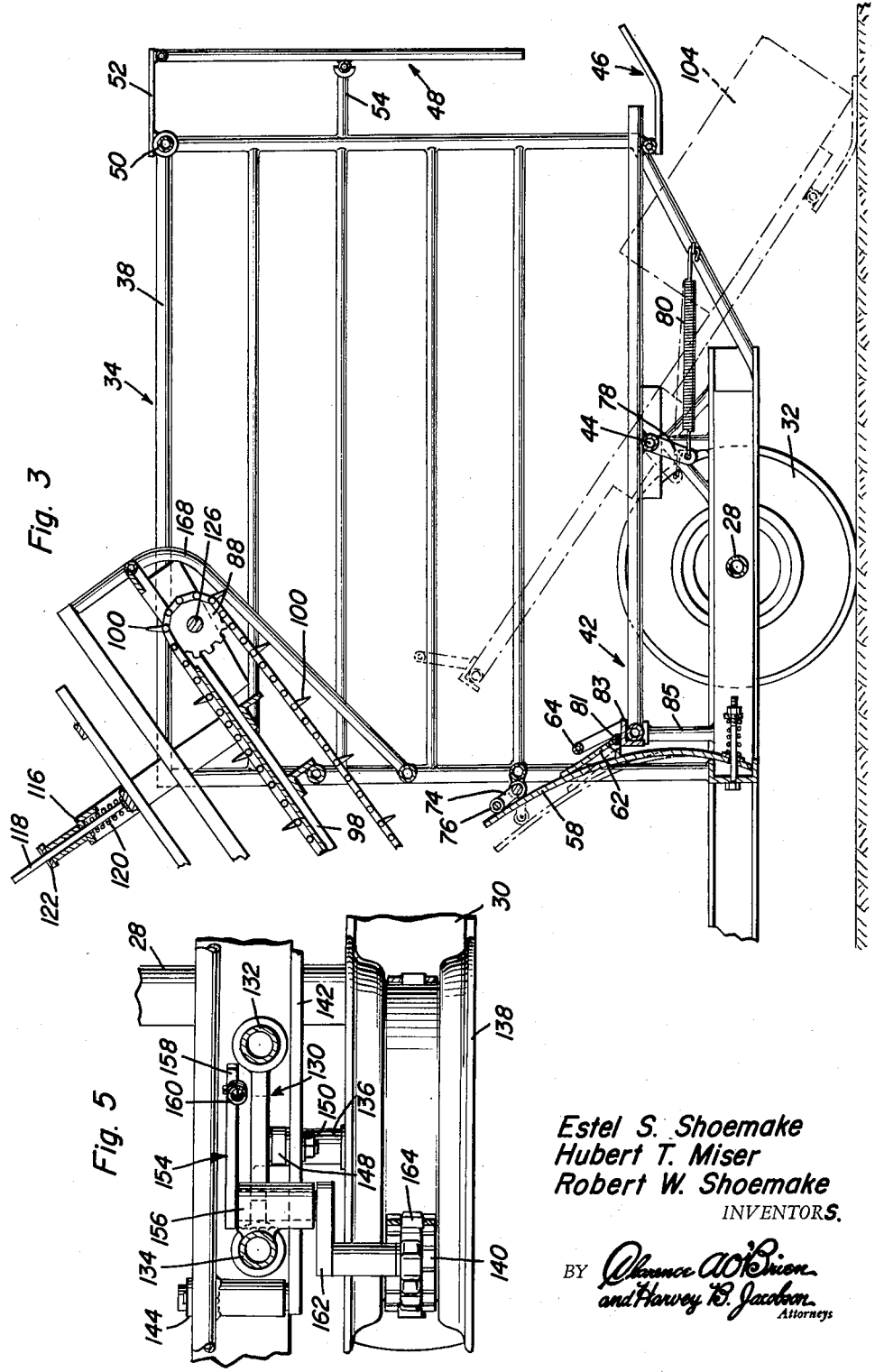
Estel S. Shoemake
Hubert T. Miser
Robert W. Shoemake
INVENTORS.
BY *Clarence A. O'Brien*
and *Harvey B. Jacobson*
Attorneys March 3, 1964    E. S. SHOEMAKE ET AL    3,123,239
DUMP TRAILER FOR AUTOMATIC HAY BALER
Filed Sept. 6, 1961    4 Sheets-Sheet 4
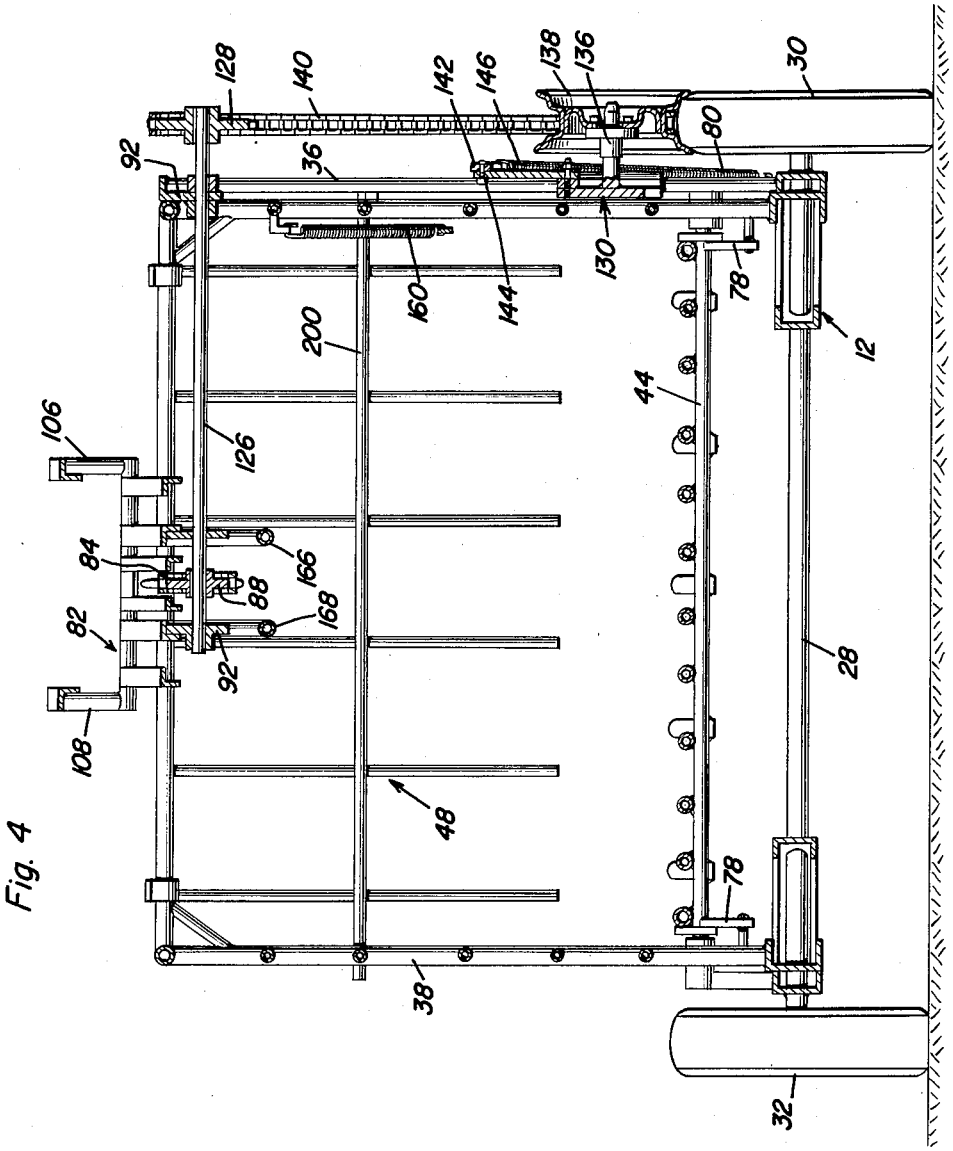
Estel S. Shoemake
Hubert T. Miser
Robert W. Shoemake
INVENTORS.
BY *Clarence A. O'Brien*
and *Harvey B. Jacobson*
Attorneys United States Patent Office 3,123,239
Patented Mar. 3, 1964

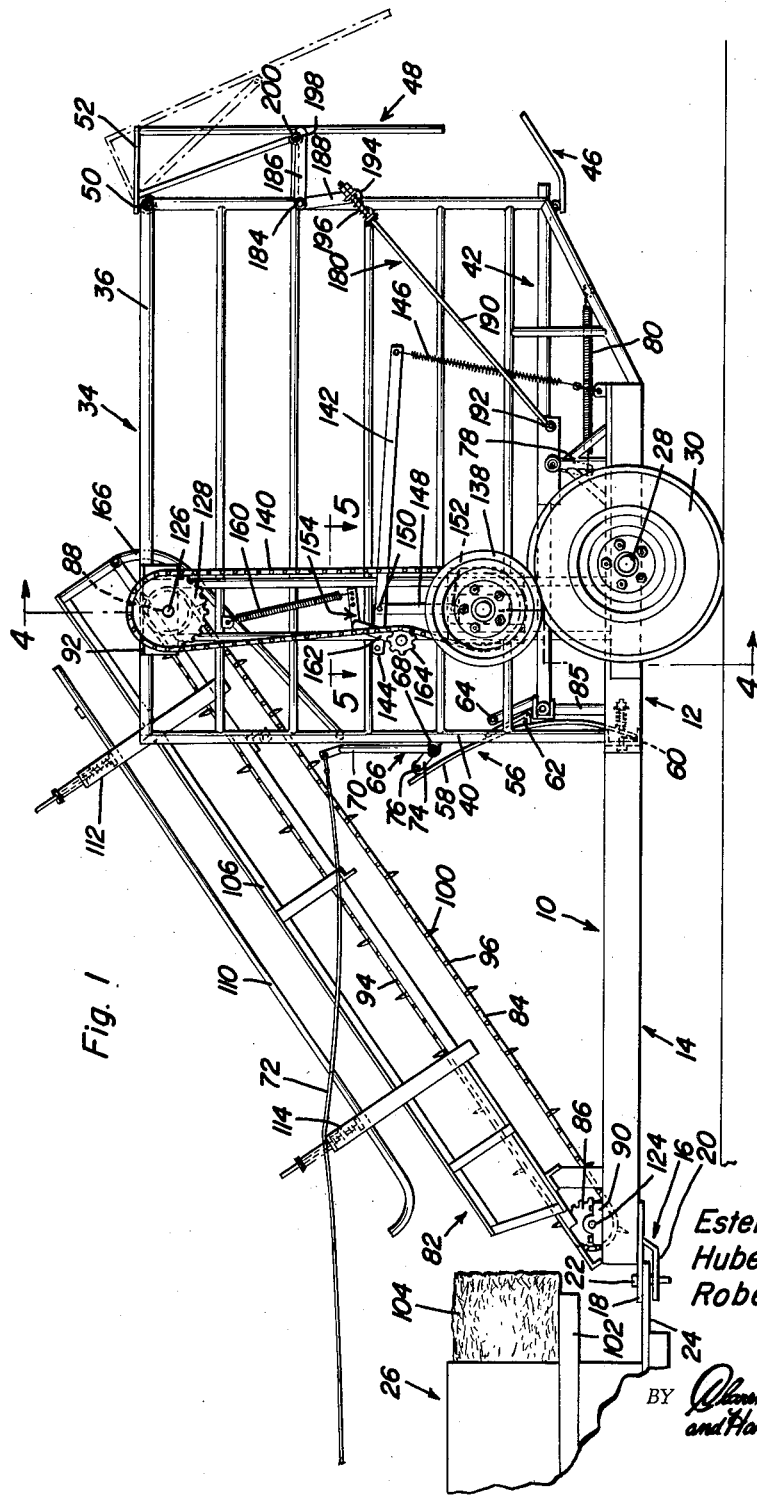

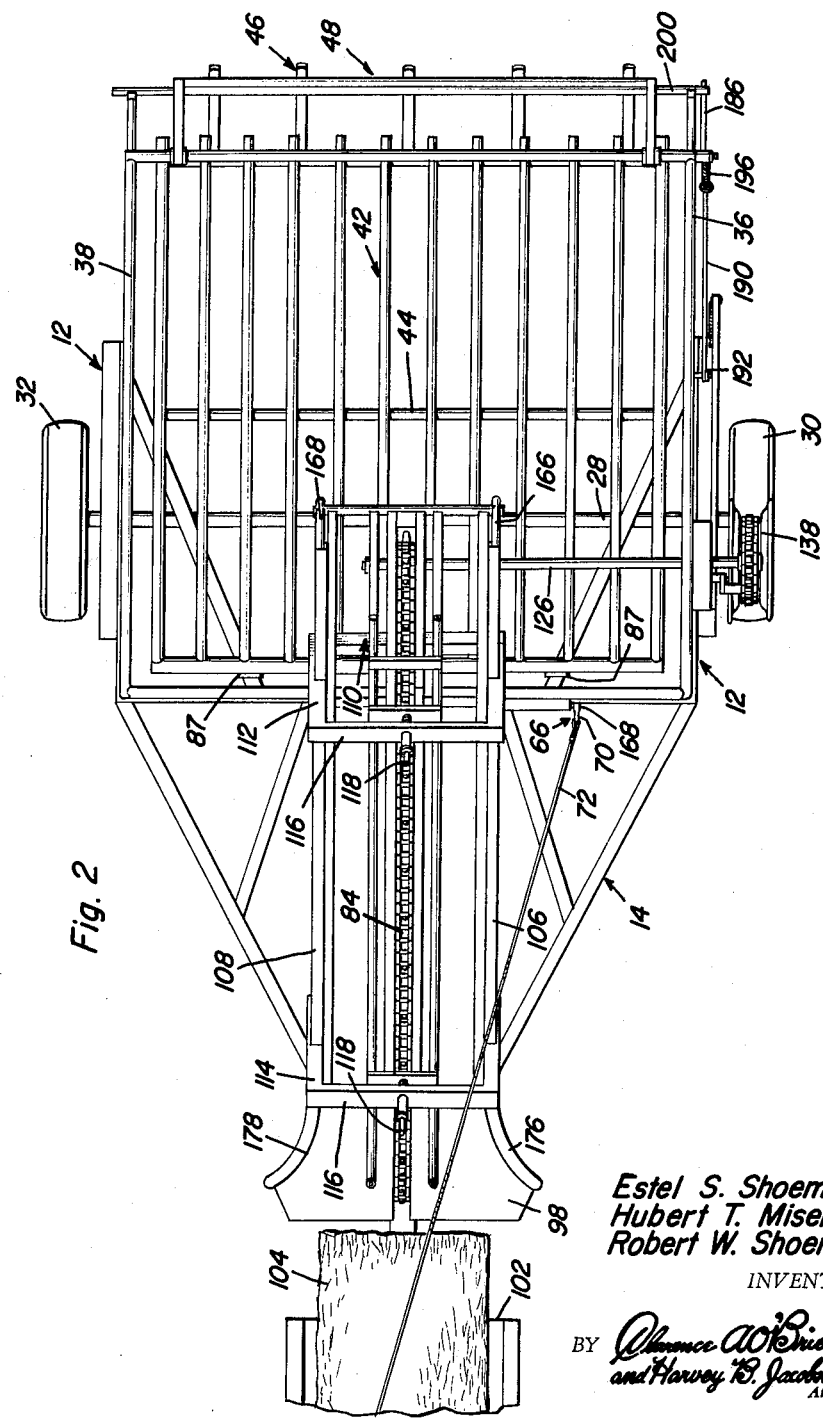

1

3,123,239
DUMP TRAILER FOR AUTOMATIC HAY BALER
Estel S. Shoemake, Rte. 2, Hubert T. Miser, Rte. 3, and Robert W. Shoemake, Rte. 2, all of Chickasha, Okla.
Filed Sept. 6, 1961, Ser. No. 136,260
4 Claims. (Cl. 214—355)

This invention relates to a novel and useful dump trailer for an automatic hay baler and more specifically to a dump trailer adapted to be towed behind an automatic hay baler and to receive bales of hay or other material from the automatic baler. The dump trailer is provided with a bin which is open at the top and at the rear and an elongated conveyor assembly for receiving the bales from the automatic baler and conveying the bales rearwardly and upwardly into the bin of the dump trailer. The dump trailer bin includes forward and opposite side walls that are fixedly secured to the main frame in any convenient manner. Further, the bin is provided with a bottom which is pivotally mounted from the main frame of the dump trailer for movement about an axis extending transversely of the main frame and lying in a transverse vertical plane passing through the front half of the bin for movement between a first substantially horizontally disposed position and a second rearwardly and downwardly inclined dump position. Coacting releasable latch means is carried by the main frame and bottom for retaining the latter in the horizontal position. As the baler is moved along a windrow towing the dump trailer behind, the baler will form bales of the material defining the windrow and intermittently eject bales to the endless conveyor which will in turn convey the bales rearwardly and upwardly into the storage bin of the dump trailer. After the dump trailer has been filled with bales, the coacting latch means may be manipulated to release the bottom of the bin and to enable free pivoting movement of the latter whereby the load disposed on the bottom will cause the bottom to pivot to a rearwardly and downwardly inclined position which will enable the bales within the dump trailer to be discharged from the latter inasmuch as the axis of rotation of the bottom is disposed in a transversely extending vertical plane passing through the forward half of the bin thereby placing the greater portion of the load supported by the bottom rearwardly of the axis of rotation of the bottom.

In this manner, trucks may follow the automatic baler and dump trailer and pick up a large number of bales at each position thereby eliminating the necessity of the truck stopping to pick up each individual bale discharged from the automatic baler.

The main object of this invention is to provide a dump trailer for an automatic baler which will greatly facilitate the picking up of bales of hay discharged on the ground from a hay baler.

A further object of this invention, in accordance with the immediately preceding object, is to provide a dump trailer having a bottom that is pivotally connected to the frame of the trailer and is utilized for collecting the bales of hay as they are discharged from the baler and for discharging the bales in piles so that they are conveniently disposed in large groups thereby enabling a truck to be more efficiently used in picking up the bales of hay.

A further object of this invention is to provide a dump trailer with a storage and dump bin provided with a free swinging rear wall dependingly supported at its upper end across the top of the rear of the bin of the trailer for movement about a horizontal transversely extending axis and between a substantially vertical position and a downwardly and rearwardly inclined position with the lower end of the year wall spaced rearwardly from the lower portion of the rear of the bin whereby as the bottom of the bin is downwardly and rearwardly pivoted the bales of hay sliding down the rearwardly and downwardly inclined bottom of the trailer will engage the rear wall of the bin and pivot the lower end thereof rearwardly and upwardly to enlarge the opening in the rear of the bin and thus facilitate the discharge of a plurality of bales therefrom.

A final object to be specifically enumerated herein is to provide a dump trailer for an automatic baler which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the dump trailer shown pivotally secured to the rear end of an automatic baler;

FIGURE 2 is a top plan view of the embodiment illustrated in FIGURE 1;

FIGURE 3 is a fragmentary longitudinal vertical sectional view of the rear portion of the dump trailer;

FIGURE 4 is an enlarged transverse vertical sectional view taken substantially upon the plane indicated by the section line 4—4 of FIGURE 1; and FIGURE 5 is an enlarged fragmentary horizontal sectional view taken substantially upon the plane indicated by the section line 5—5 of FIGURE 1.

Referring now more specifically to the drawings the numeral 10 generally designates the dump trailer of the instant invention. The dump trailer 10 includes a main frame generally referred to by the reference numeral 12 having a forwardly projecting drawbar generally referred to by the reference numeral 14. The forward end of the drawbar 14 is provided with a bifurcated hitch member generally referred to by the reference numeral 16 whose furcations 18 and 20 are provided with alined bores (not shown) through which a pivot pin 22 extends and by which the drawbar 14 is pivotally secured to the hitch element 24 carried by the hay baler generally referred to by the reference numeral 26 and disposed between the furcations 18 and 20.

The main frame 12 includes a transversely extending axle member 28 and a pair of ground-engaging wheels 30 and 32 are journalled on opposite ends of the axle member 28.

The main frame includes a receiving and dumping bin generally referred to by the reference numeral 34 which includes a pair of upstanding side walls 36 and 38 and a forward or front wall 40. The side walls 36 and 38 and the front wall 40 are fixedly secured to the main frame 12 and the bin 34 includes a bottom generally referred to by the reference numeral 42 which extends longitudinally of the bin 34 and is mounted for movement about a transversely extending horizontally disposed axis by means of pivot shaft 44. It will be noted that the pivot shaft 44 extends through a vertical transverse plane which passes through the forward half of the bottom wall 42.

The bottom wall 42 includes an extension generally referred to by the reference numeral 46 which is secured to the rear edge portion of the bottom 42 and extends rearwardly and upwardly away from the rear end of the bottom 42.

A rear wall generally referred to by the reference numeral 48 is pivotally secured at its upper end across the top of the rear of the bin 34 by means of a pivot shaft 50 and it will be noted that the upper end of the rear wall 48 includes a pair of forwardly directed support arms 52 whose forward ends are secured to the bin 34 by means of the pivot shaft 50. In this manner, the rear wall 48 is normally urged toward a substantially vertically disposed rest position engaging the abutments 54 which extend rearwardly of the side walls 36 and 38. Inasmuch as the support arms 52 position the axis of rotation of the rear wall 48 forwardly of the plane in which the rear wall 48 is disposed, gravity will normally urge the rear wall 48 to the rest position illustrated in FIGURE 1.

Coacting latch means generally referred to by the reference numeral 56 includes a leaf spring member 58 secured to the main frame at one end as at 60 and the leaf spring 58 includes a latch element 62 which is secured to its midportion. The latch element 62 is utilized to retain the bottom 42 in the horizontally disposed position illustrated in FIGURE 1 of the drawings, and it will be noted that the forward end of the bottom 42 includes an abutment element 64 adapted to prevent bales of hay from engaging the latch element 62 and the leaf spring member 58.

A bell crank generally referred to by the reference numeral 66 is pivotally secured to the front wall 40 by means of pivot shaft 68 and one arm 70 of the bell crank 66 has one end of a flexible pull member 72 secured thereto. The other arm 74 of the bell crank 66 has a roller 76 journalled on its free end and disposed in rolling contacting relation with the free end of the leaf spring 58. Accordingly, a forward pull on the pull member 72 will cause the arm 74 and its roller 76 to cam the free end of the leaf spring 58 forwardly in order to disengage the latch element 62 from the forward end of the bottom wall 42. However, the pivot shaft 44 has a pair of crank arms 78 whose free ends are connected to the sides 36 and 38 by means of expansion springs 80. The expansion springs 80 normally resiliently urge the bottom wall 42 to its horizontally disposed position illustrated in FIGURE 1 of the drawings. It will be further noted that the latch element 62 has a roller 81 mounted on its rearmost end for rolling engagement with the abutment flange 83 carried by the center portion of the bottom wall 42.

It will be noted that the bin 34 has its various components constructed of tubular frameworks and in this manner the weight of the bin and the dump trailer 10 is maintained at a minimum. Additionally, the frame 12 is provided with a pair of upright abutment standards 85 having upwardly opening saddle-like seating members 87 on their uppermost ends for receiving the forward end of the bottom wall 42 and establishing a lower limit position for the forward end thereof.

The dump trailer 10 includes a conveyor assembly generally referred to by the reference numeral 82 and the conveyor assembly 82 comprises an endless flexible member 84 entrained about a pair of supporting wheels 86 and 88 which are journalled for rotation about transversely extending axes by the journal blocks 90 carried by the forward end of the drawbar 14 and the journal blocks 92 carried by the upper portions of the side wall 36 and upper portion of conveyor assembly 82. The endless flexible member 84 includes upper and lower reaches 94 and 96 and the conveyor assembly includes a support deck 98 over which the upper reach 94 of the endless flexible member 84 is disposed. The endless flexible member 84 includes a plurality of longitudinally spaced and outwardly projecting bale impaling elements 100 and it will be noted that the conveyor assembly 82 is rearwardly and upwardly inclined and has its forward end disposed immediately adjacent and rearwardly of the rear end of the discharge chute or deck 102 of the automatic baler 26. Accordingly, as a bale 104 is discharged from the deck 102, the impaling elements 100 will engage the bale and pull the bale 104 upwardly along the conveyor assembly 82 by means of the endless flexible member 84.

The conveyor assembly 82 includes opposite side longitudinally extending and upwardly projecting sides 106 and 108 which prevent lateral movement of the bale 104 relative to the direction of movement of the endless flexible member 84. In addition, an elongated top member generally referred to by the reference numeral 110 is provided and extends longitudinally of the conveyor and is supported by means of mounting brackets 112 and 114 above and in vertical alinement with the upper reach 94 of the endless flexible member 84. Each of the mounting brackets is generally inverted U-shaped in configuration and includes a bight portion 116 through which a support rod 118 is slidably received. The support rods 118 are each resiliently urged to a lowermost position by means of a compression spring 120 disposed between the corresponding bight portion 116 and the top member 110 and each support rod 118 includes a stop member limiting downward movement of the corresponding rod 118. In this manner, the top member 110 yieldably urges the bales 104 into engagement with the impaling elements 100 to insure that the bales 104 will be firmly gripped by the endless flexible member 84 and conveyed to the upper end of the conveyor assembly 82.

The supporting wheels 86 and 88 are carried by axle members 124 and 126 respectively and the axle member 126 projects outwardly of the side wall 36 and has a drive sprocket 128 secured thereto. A slide support member generally referred to by the reference numeral 130 is slidably mounted on the side wall 36 by means of a pair of vertically extending tubular brace members 132 and 134 and a spindle 136 extends outwardly from the outer face of the support slide member 130 and has a pulley wheel 138 journalled thereon. An endless flexible member 140 is entrained about the drive sprocket 128 and the pulley wheel 138. An operating lever 142 is pivotally secured to the side wall 34 as at 144 at one end and is secured to the main frame 12 at the other end by means of an expansion spring 146. The expansion spring 146 normally urges the rear end of the lever arm 142 downwardly and the mid-portion of the lever arm 142 is connected to the slide support member 130 by means of a connecting link 148 whose opposite ends are pivotally secured to the lever arm 142 as at 150 and the support slide member 130 as at 152. Accordingly, upon downward movement of the rear end of the lever arm 142, it may be seen that the pulley wheel 138 may be moved into engagement with the ground-engaging wheel 30 thus drivingly connecting the endless flexible member 84 with the ground-engaging wheel 30.

A bell crank generally referred to by the reference numeral 154 is pivotally mounted on the vertically extending tubular brace member 134 as at 156 for movement about a horizontal transversely extending axis and one arm 158 of the bell crank 154 has its free end secured to the side wall 36 by means of an expansion spring 160. The other arm 162 of the bell crank 154 has an idler tensioning wheel 164 rotatably journalled thereon and mounted by means of the bell crank 154 for swinging movement in the plane in which the endless flexible member 140 is disposed in order that the idler sprocket 164 may be utilized to maintain proper tension on the endless flexible member 140.

With attention now directed to FIGURES 1-3 of the drawings it will be noted that the conveyor assembly 82 includes a pair of guard support arms 166 and 168 which project rearwardly of the upper end of the endless flexible member 84 and beneath the rear portion of the lower reach 96 thereof whereby bales 104 disposed within the bin 34 will be prevented from coming into contact with the endless flexible member 84.

With attention now directed to FIGURE 2 of the drawings it may be observed that the lower ends of the sides 106 and 108 include outwardly curving lower end portions 176 and 178 respectively and that the support deck 98 extends between and slightly forwardly of the lower end portions 176 and 178 whereby the bales 104 being discharged from the deck 102 will be funneled into the inlet end of the conveyor assembly 82.

It may be seen from FIGURES 1 and 2 that an automatic latch assembly for the rear wall 48 is generally referred to by the reference numeral 180 and includes a generally L-shaped bell crank 182 which is pivotally secured to the side wall 36 as at 184 and includes a pair of arms 186 and 188. The arm 188 is operatively connected to the bottom wall 42 by means of a pull rod 190 whose opposite ends are pivotally secured to the bottom wall 42 as at 192 and to the free end of arm 188 as at 194 respectively. The rod 190 includes a lost motion connection with the arm 188 including the compression spring 196 and the compression spring normally resiliently urges the latch arm 186 to the latched position illustrated in FIGURE 1 when the bottom wall is disposed in the load carrying position with the notch 198 formed in the free end of the arm 186 engaged with the adjacent end of the transverse brace member 200 of of the rear wall 48 to retain the latter in a closed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dump trailer for an automatic hay baler, said dump trailer comprising an elongated main frame having a drawbar projecting forwardly from its forward end with securing means on its forward terminal end portion adapted for pivotal securement to the rear end of a hay baler adjacent the delivery end of the discharge chute thereof, said main frame including ground-engaging support wheels journalled for rotation about axes extending transversely of said main frame, a storage and dump bin open at the top and rear fixed on said frame substantially directly over said axis and including a bottom pivotally mounted from said main frame for movement about an axis extending transversely of said main frame and lying in a transverse vertical plane passing through the forward half of said bin for movement between a first substantially horizontal position and a second rearwardly and downwardly inclined dump position, coacting releasable latch means carried by said main frame and bottom for retaining the latter in said first position, rearwardly and upwardly inclined elongated conveyor means extending from its inlet end at a point adjacent said securing means to its outlet end at a point spaced rearwardly of the forward end of said bin and adapted to receive bales from said chute and convey said bales upwardly and rearwardly to a point disposed above said bottom, said conveyor means including a transversely extending outwardly projecting and horizontally disposed input shaft having a sprocket wheel mounted on its outer end portion, a friction sprocket wheel, means mounting said friction sprocket wheel on said trailer in alignment with and for vertical movement into and out of driven frictional engagement with one of said support wheels, an endless flexible chain entrained about and drivingly connecting said friction wheel to said sprocket wheel, chain tensioning means supported from said bin and engaged with said chain for tensioning the latter and actuator means operatively connected between said bin and said friction wheel for selectively engaging the latter with said one support wheel.

2. The combination of claim 1 wherein said latch means also includes means for limiting movement of said bottom from said second position toward said first position.

3. The combination of claim 2 including means resiliently urging said bottom toward said first position.

4. The combination of claim 1 including a rear wall, means pivotally securing said rear wall at its upper end across the top of the rear of said bin for movement about a horizontal transversely extending axis, said rear wall normally extending downwardly across approximately the upper three-quarters of the rear of said bin and mounted for movement between a depending substantially vertical position and a downwardly and rearwardly inclined position with the lower end of said rear wall spaced rearwardly from the lower portion of the rear of said bin.

References Cited in the file of this patent

UNITED STATES PATENTS

| | | |
|---|---|---|
| 1,912,232 | Wehrhahn et al. | May 30, 1933 |
| 2,154,790 | Vanderberg et al. | Apr. 18, 1939 |
| 2,211,195 | Biszantz | Aug. 13, 1940 |
| 2,605,915 | Day | Aug. 5, 1952 |
| 2,727,352 | Jones | Dec. 20, 1955 |
| 2,732,679 | McCombs | Jan. 31, 1956 |
| 2,796,162 | Bellingham | June 18, 1957 |
| 2,845,770 | Fessler | Aug. 5, 1958 |